July 31, 1956 — S. N. ZARRILLO — 2,757,264
ELECTRIC CONTROL
Filed April 28, 1953
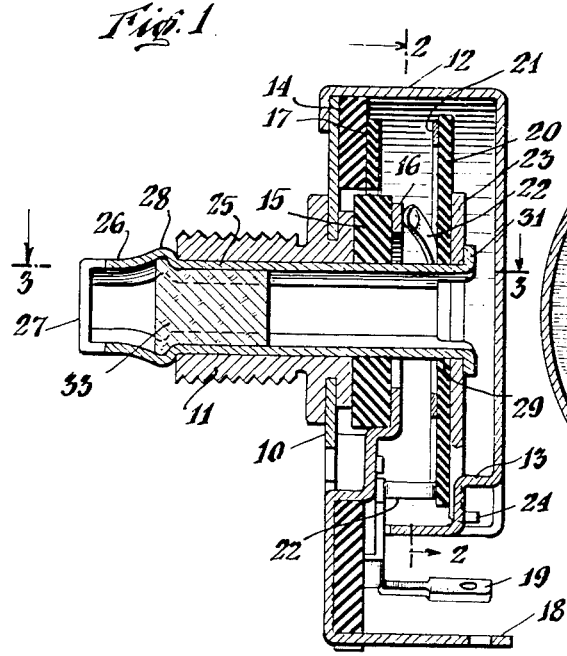
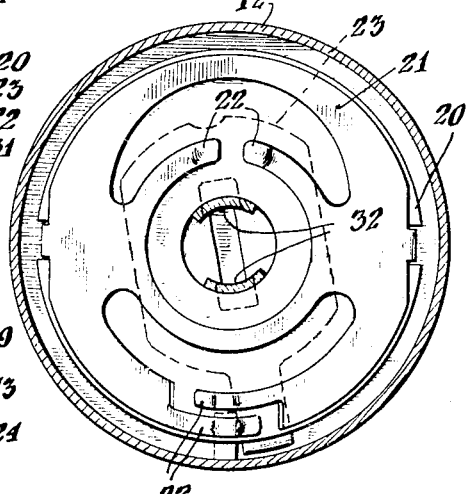
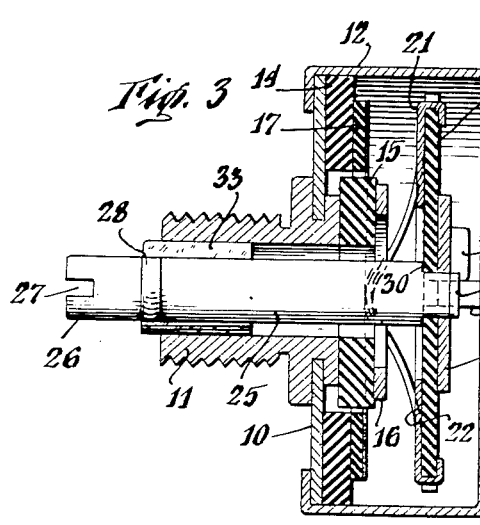
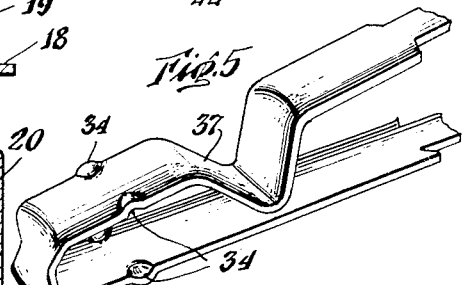
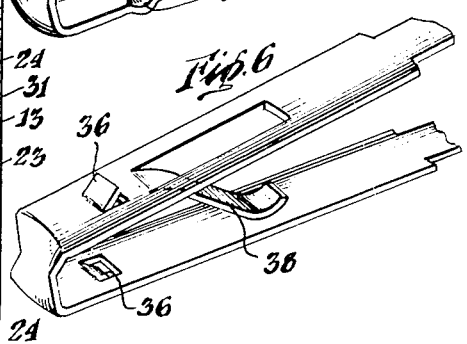
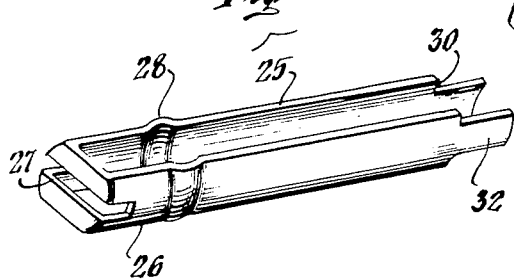
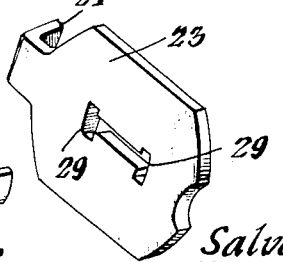
INVENTOR.
Salvatore N. Zarrillo
BY
Kane, Dalsimer
and Kane
ATTORNEYS

United States Patent Office 2,757,264
Patented July 31, 1956

2,757,264
ELECTRIC CONTROL

Salvatore N. Zarrillo, Salmon Falls, N. H., assignor to Clarostat Mfg. Co., Inc., Dover, N. H., a corporation of New York Application April 28, 1953, Serial No. 351,629

4 Claims. (Cl. 201—55)

This invention relates to an electrical control and in its more specific aspects aims to provide a structure which will incorporate improved functional design characteristics.

It is an object of the invention to furnish parts for an electrical control which, in comparison with corresponding parts as heretofore provided, may be economically produced, aside from the fact that they may be readily assembled with other parts to furnish a unitary structure operating over long periods of time with freedom from all difficulties.

Moreover, by means of the present teachings, a structure is furnished, in which such assembly may be achieved by relatively unskilled labor without the use of special tools or the skills necessary to operate them or without it being necessary to machine the elements or to provide special parts. Also, unless deliberately disassembled, the parts will remain against displacement or accidental detachment with respect to each other for the life of the control.

With these and other objects in mind, reference is had to the attached sheet of drawings, illustrating practical embodiments of the invention and in which:

Fig. 1 is a sectional side view of one form of control embodying the present teachings;

Fig. 2 is a transverse sectional view taken along the line 2—2 and in the direction of the arrows as indicated in Fig. 1;

Fig. 3 is a sectional plan view taken along the line 3—3 in the direction of the arrows as also indicated in Fig. 1;

Fig. 4 is an exploded view of one form of shaft and a part of the rotor assembly;

Fig. 5 is a perspective view of a shaft different from that shown in the control as embodied in Figs. 1 to 3; and Fig. 6 is a view similar to Fig. 5 but showing a still further form of shaft structure.

Referring primarily to Figs. 1, 2 and 3, the invention has been shown as including the parts of a potentiometer involving a resistance, a collector ring and a rotor assembly presenting contact or wiper arms for cooperation with the ring and resistance; that assembly being supported for rotation by the control shaft. As will be apparent from a reading of the following specification, the present teachings might be included in various other forms of controls of the electrical type. Also, the shaft need not necessarily operate the control by rotational movement. Therefore, except where limited by the appended claims, the present drawings and descriptions are to be taken in an illustrative, rather than a limiting, sense.

Thus, referring to Figs. 1, 2 and 3, the stator assembly may include a plate 10 from which a bushing 11 extends; the parts being secured to each other in any desired and conventional manner. Likewise, to preferably provide a complete casing, a cup-shaped member 12 is included and has its base furnished with an instruck portion 13 to supply one part of a stop structure. Also forming a part of the stator assembly is an insulating plate 14 positioned against movement adjacent the inner face of plate 10 and formed with an opening within which the inner hub portion of bushing 11 may be accommodated.

Abutting this hub or base portion of the bushing and also disposed to extend within the opening of plate 14 is an insulating washer 15. The latter mounts a collector ring 16. An arcuate resistance strip 17 is supported in contact with the face of plate 14. This strip is—as shown—of the coated type. It might obviously be of other types. Likewise, it, together with the collector ring, does not have to extend in a direction transverse to the axis of the control. A lead is disposed conveniently in the manner shown, to connect the ring with a terminal 18. Other terminals 19 also extending beyond the casing of the control are connected one to each of the ends of the resistance 17 in this embodiment of the invention.

The rotor assembly conveniently includes a mounting plate or disk 20 of insulating material to the inner end of which is affixed a structure which takes the form of a ring 21 of metal and formed with wiper or contact arms 22 which engage the surfaces of the collector ring 16 and the resistance 17 and traverse the same as the rotor is turned. Beyond plate 20, a plate 23 is conveniently disposed. This plate may be formed of metal and provide an outstanding portion 24 for cooperation with the instruck portion 13 so that a stop structure is supplied, limiting rotation of the assemblies with respect to each other.

The parts of the rotor assembly are mounted and turned by means of a shaft. This shaft, contrary to conventional construction, comprises a strip preferably of metal and bent upon itself as in Figs. 1 and 4 to provide a U-shaped element. The width of the legs 25 of the element may involve any desired dimension consistent with their being inserted into and being rotatably supported within the bore of bushing 11. The base portion 26 of the element either mounts an actuating part (not shown) or else may be formed with a slot 27 suitable for engagement with a screw driver or other proper unit so that the shaft may be rotated. Adjacent its base portion and intervening the same and the legs 25, a guiding structure is furnished according to the preferred embodiment of this invention. That guiding structure as in Figs. 1 to 4 may include arcuate outwardly extending beads 28 defining an outer shaft diameter greater than the bore of bushing 11. The free ends of legs 25 are preferably notched in order to reduce their widths. As especially shown in Fig. 4, plate 23 may be formed with arcuately extending slot portions 29, each of which accommodates one of the free ends of the leg portions 25. As illustrated, plate 20 of the rotor assembly is formed with similar slots; it being apparent that the shoulders 30 defining the inner ends of the reduced outer leg portions 32 serve as positioning and maintaining surfaces for plates 20 and 23.

The element providing the shaft is preferably formed of strip metal. It may obviously be formed of other material. It should conveniently be of a character such that it incorporates a certain amount of resiliency. In any event, its parts should be capable of flexing so that they may be deformed without too much difficulty. As in Figs. 1 to 3, the reduced ends 32 of leg portions 25 may—after receiving plates 20 and 23—be bent outwardly as indicated at 31. Otherwise these ends may be secured to the plates by riveting or in any other manner. In any event, it is apparent that a movement of plates 20 and 23 to the right as viewed in Fig. 1 and with respect to the shaft is prevented. It is desirable to insert a plug 33 into the bore of the shaft as defined between the legs 25. This plug may be formed of any suitable material such as rubber, cork, etc. Frictional contact with the bore of the shaft will prevent any accidental axial displacement of the plug. Additionally, if desired and as shown in Fig.

1, the plug might extend into the recess provided by the inner face of bead 28. This element will assure bearing contact between the shaft and bushing. Also, it will prevent foreign particles lodging within the shaft end.

It will be appreciated that with the parts assembled in the manner shown in Figs. 1, 2 and 3, an axial displacement of the shaft, together with the parts carried thereby to the right as viewed in Fig. 1, will be prevented by bead 28. A displacement in the opposite direction will be resisted incident to the engagement between the contact or wiper arms 22 and the surfaces of the collector ring and resistance and because plate 20 is provided outwardly of these contact or wiper arms. This plate—as afore brought out—will not shift with respect to the shaft in a right-hand direction as in Fig. 1, because of the terminal portions 31 or 32 of the free ends of the arms which bear against the surfaces of plate 23.

In lieu of bead 28, it is, of course, apparent that a number of different structures might be employed. For example, as in Fig. 5, outwardly struck portions 34 might be furnished as part of the legs providing the shaft. Likewise, as in Fig. 6, outwardly extending tongues 36 might be furnished. If desired, the shaft may have one of its legs extend inwardly as at 37 to provide torsional rigidity for the shaft. The same effect is conveniently achieved by the employment of a tongue portion 38 as in Fig. 6. Obviously, various other structures might also be employed to assure that the shaft bears in proper contact with the bore of the bushing and has correct torsional qualities.

Where a plug 33 is utilized, it may extend beyond the opposed edges of the legs into bearing contact with the bore of the bushing. It may be preferred that the free ends of the shaft strip provide readily releasable detent parts cooperating with surfaces of the rotor assembly to normally prevent detachment of the latter. Usually, however, the ends are fixedly secured to form a part of the rotor assembly. These ends may, of course, be modified as desired to engage with the proper surfaces of the rotor assembly and as shown in Fig. 4 these surfaces may include arcuate slits. However, an opening or openings of any desired configuration might be employed as part of the rotor, in which case the free ends of the leg or legs would be modified to present surfaces of the desired contour.

Regardless of these details, it is apparent that the rotor assembly will be completed and only then will the outer shaft end be pushed through the bushing. Such movement will be to the left as viewed in Figs. 1 and 3. Due to the compressibility of the shaft, its bead 28 (or outwardly struck portions 34, or tongues 36) will ride through the bushing bore and expand beyond the outer end of the same to ride against its edge. As a consequence, it will not be necessary to use a C-ring, groove the shaft and otherwise resort to the relatively expensive procedure ordinarily employed to restrain the shaft against axial inwardly movement with respect to the bushing.

Thus, among others, the several objects of the invention as specifically aforestated are achieved. Obviously, numerous changes in construction and rearrangement of the parts might be resorted to without departing from the spirit of the invention as defined by the claims.

I claim:

1. An electrical control structure including in combination a stator embracing an apertured casing portion, a bushing secured to said casing with its bore in line with such aperture and a resistance mounted by said casing and concentrically disposed with respect to the aperture, a rotor assembly comprising an arm, a shaft including a strip bent upon itself to provide a pair of parallel legs having free inner ends, connected opposite ends and a radially bulged portion short of the latter and means for securing said free ends to said arm to provide such rotor assembly separate from the stator structure, the connected ends of said legs being insertable through the bore of said bushing and flexing towards each other whereby the bulged leg portion also passes through such bore and beyond the same to shift into bearing engagement with the bushing end and said arm riding under such conditions in engagement with said resistance.

2. In a combination as in claim 1 a mounting portion for a knob on said shaft in a direction away from said bushing and adjacent the outwardly bulged portions.

3. In a combination as in claim 1 a resilient plug between the legs of said shaft.

4. In a combination as in claim 1 said outwardly bulged portions comprising ridges defining arcs having a greater radius than said shaft.

References Cited in the file of this patent

UNITED STATES PATENTS

| | | |
|---|---|---|
| 2,553,650 | Geci | May 22, 1951 |
| 2,632,830 | Aust et al. | Mar. 24, 1953 |